US011132609B2

(12) United States Patent
Pascanu et al.

(10) Patent No.: US 11,132,609 B2
(45) Date of Patent: Sep. 28, 2021

(54) MULTI-TASK NEURAL NETWORK SYSTEMS WITH TASK-SPECIFIC POLICIES AND A SHARED POLICY

(71) Applicant: DeepMind Technologies Limited, London (GB)

(72) Inventors: Razvan Pascanu, Letchworth Garden City (GB); Raia Thais Hadsell, London (GB); Victor Constant Bapst, London (GB); Wojciech Czarnecki, London (GB); James Kirkpatrick, London (GB); Yee Whye Teh, Oxford (GB); Nicolas Manfred Otto Heess, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/689,020

(22) Filed: Nov. 19, 2019

(65) Prior Publication Data

US 2020/0090048 A1     Mar. 19, 2020

Related U.S. Application Data

(63) Continuation of application No. PCT/EP2018/063275, filed on May 22, 2018.

(60) Provisional application No. 62/508,991, filed on May 19, 2017.

(51) Int. Cl.
*G06N 3/08* (2006.01)
*G06N 3/10* (2006.01)
*G06N 5/04* (2006.01)

(52) U.S. Cl.
CPC ............... *G06N 3/084* (2013.01); *G06N 3/10* (2013.01); *G06N 5/043* (2013.01)

(58) Field of Classification Search
CPC ........... G06N 3/084; G06N 3/10; G06N 5/043
See application file for complete search history.

(56) References Cited

U.S. PATENT DOCUMENTS

2018/0165602 A1* 6/2018 Van Seijen ............ G06N 20/00

OTHER PUBLICATIONS

Devin et al, "Learning Modular Neural Network Policies for Multi-Task and Multi-Robot Transfer," arXiv:1609.07088v1, Sep. 22, 2016, 8 pages (Year: 2016).*

(Continued)

*Primary Examiner* — Daniel C Puentes
(74) *Attorney, Agent, or Firm* — Fish & Richardson P.C.

(57) ABSTRACT

A method is proposed for training a multitask computer system, such as a multitask neural network system. The system comprises a set of trainable workers and a shared module. The trainable workers and shared module are trained on a plurality of different tasks, such that each worker learns to perform a corresponding one of the tasks according to a respective task policy, and said shared policy network learns a multitask policy which represents common behavior for the tasks. The coordinated training is performed by optimizing an objective function comprising, for each task: a reward term indicative of an expected reward earned by a worker in performing the corresponding task according to the task policy; and at least one entropy term which regularizes the distribution of the task policy towards the distribution of the multitask policy.

27 Claims, 3 Drawing Sheets

(56) References Cited

OTHER PUBLICATIONS

Levine et al, "Guided Policy Search", Proceedings of the 30th International Conference on Machine Learning, 2013, 9 pages, (Year: 2013).*

Duan et al, "A multi-agent reinforcement learning approach to robot soccer", Jun. 2011, Springer Science+Business Media, all pages (Year: 2011).*

Anonymous, "DisTral: Distilling and Transferring Common Behavior for Multitask Deep RL," 31st Conference on Neural Information Processing Systems, 2017, 11 pages.

Beattie et al., "DeepMind Lab," arXiv:161203801v2, Dec. 13, 2016, 11 pages.

Bellemare et al., "The Arcade Learninig Environment: An Evaluation Platform for General Agents," Journal of Artificial Intelligence Research 47 (2013) 253-279, Jun. 2013, 27 pages.

Bengio; Yoshua, "Deep Learning of Representations for Unsupervised and Transfer Learning," JMLR: Workshop and Conference Proceedings 27:17-37, 2012, 21 pages.

Boyd et al., "Distributed optimization and statistical learning via the alternating direction method of multipliers," Found. Trends Mach. Learn., 3(1), Jan. 2011, 13 pages.

Bucilă al., "Model compression," In Proc. of the Int'l Conference on Knowledge Discovery and Data Mining (KDD), 2006, 7 pages.

Caruana; Rich, "Multitask learning," Machine Learning, 28(1):41-75, Jul. 1997, 35 pages.

Dempster et al., "Maximum likelihood from incomplete data via the em algorithm," Journal of the royal statistical society, Series B (methodological), pp. 1-38, 1977, 39 pages.

Devine et al., "Learning Modular Neural Network Policies for Multi-Task and Multi-Robot Transfer," arXiv:1609.07088v1, Sep. 22, 2016, 8 pages.

Fox et al., "Principled option learning in markov decision processes," In European Workshop on Reinforcement Learning (EWRL), 2016, 7 pages.

Fox, et al., "Taming the noise in reinforcement learning via soft updates," In Uncertainty in Artificial Intelligence (UAI), 2016, 11 pages.

Gelman et al., "Bayesian data analysis," vol. 2. Chapman & Hall/CRC Boca Raton, FL, USA, 2014, 4 pages.

Hinton et al., "Distilling the knowledge in a neural network," NIPS Deep Learning Workshop, 2014, 9 pages.

Jaderberg et al., "Reinforcement learning with unsupervised auxiliary tasks," Int'l Conference on Learning Representations (ICLR), 2016, 17 pages.

Kappen et al., "Optimal control as a graphical model inference problem," Machine learning, 87(2):159-182, 2012, 2 pages.

Lample et al., "Playing FPS games with deep reinforcement learning," Association for the Advancement of Artificial Intelligence (AAAI), 2017, 7 pages.

Lin et al., "Collaborative Deep Reinforcement Learning," arXiv:1702.05796v1, Woodstock '97, El Paso, Texas, Jul. 1997, 9 pages.

Mirowski et al., "Learning to navigate in complex environments," Int'l Conference on Learning Representations (ICLR), 2016, 16 pages.

Mnih et al., "Asynchronous methods for deep reinforcement learning," In Int'l Conference on Machine Learning (ICML), 2016, 19 pages.

Mnih et al., "Human-level control through deep reinforcement learning," Nature, 518(7540):529-533, Feb. 2015, 13 pages.

Nachum et al., Bridging the gap between value and policy based reinforcement learning. arXiv:1702.08892, 2017, 21 pages.

Parisotto et al., "Actor-mimic: Deep multitask and transfer reinforcement learning," In Int'l Conference on Learning Representations (ICLR), 2016, 16 pages.

Pascanu et al., "Revisiting natural gradient for deep networks," Int'l Conference on Learning Representations (ICLR), 2014, 18 pages.

PCT International Preliminary Report on Patentability in International Appln. No. PCT/EP2018/063275, dated Nov. 19, 2019, 13 pages.

PCT International Search Report and Written Opinion in International Appln. No. PCT/EP2018/063275, dated Aug. 28, 2018, 19 pages.

Rawlik et al., "On stochastic optimal control and reinforcement learning by approximate inference," In Robotics: Science and Systems (RSS), 2012, 5 pages.

Rusu et al., "Policy Distillation," arXiv:1511.06295v2, London, United Kingdom, Jan. 7, 2016, 13 pages.

Rusu et al., "Policy distillation," In Int'l Conference on Learning Representations (ICLR), 2016, 13 pages.

Schaul et al., "Prioritized experience replay," CoRR, abs/1511.05952, 2015, 21 pages.

Schulman et al., "Equivalence between policy gradients and soft Q-Learning," arXiv:1704.06440, 2017, 15 pages.

Schulman et al., "Trust region policy optimization," In Int'l Conference on Machine Learning (ICML), 2015, 9 pages.

Sutton et al., "Policy gradient methods for reinforcement learning with function approximation," In Adv. in Neural Information Processing Systems (NIPS), vol. 99, pp. 1057-1063, 1999, 7 pages.

Taylor et al., "An introduction to inter-task transfer for reinforcement learning," AI Magazine, 32(1):15-34, 2011, 15 pages.

Teh et al., "Distral: Robust Multitask Reinforment Learning," arXiv:1707.04175v1, Jul. 13, 2017, 13 pages.

Toussaint et al., "Probabilistic inference for solving (PO)MDPs," Technical Report EDI-INF-RR-0934, University of Edinburgh, School of Informatics, 2006, 24 pages.

Van Hasselt et al., "Deep reinforcement learning with double Q-learning," Association for the Advancement of Artificial Intelligence (AAAI), 2016, 7 pages.

Yin et al., "Knowledge Transfer for Deep Reinforcement," Proceedings of the Thirty-First AAA1 Conference on Artificial Intelligence, Nanyang Technological University, Singapore, 2017, 7 pages.

Yosinski, et al., "How transferable are features in deep neural networks?" In Adv. in Neural Information Processing Systems (NIPS), 2014, 9 pages.

Zhang,et al., "Deep learning with elastic averaging SGD," In Adv. in Neural Information Processing Systems (NIPS), 2015, 9 pages.

* cited by examiner

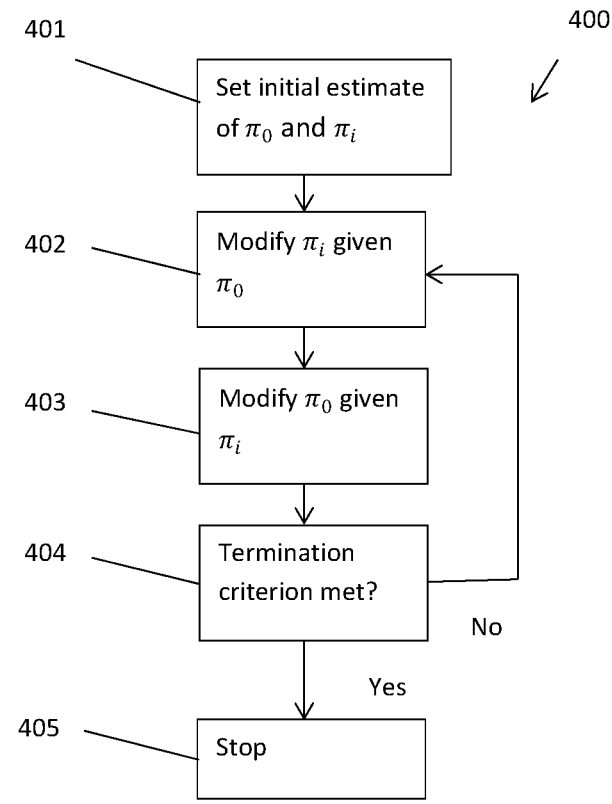
Fig. 4
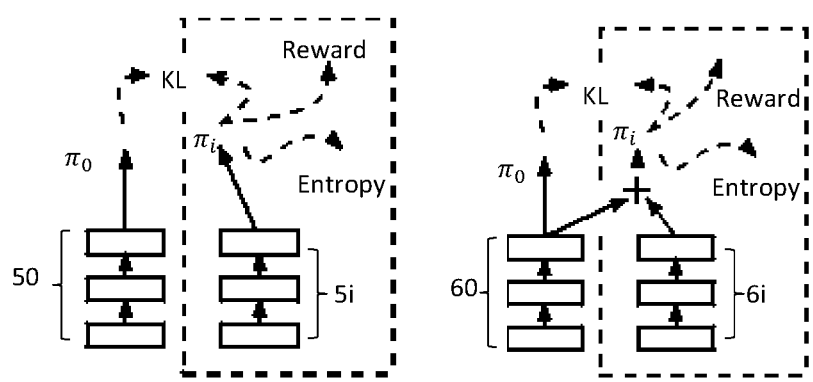
Fig. 5                    Fig. 6

US 11,132,609 B2

MULTI-TASK NEURAL NETWORK SYSTEMS WITH TASK-SPECIFIC POLICIES AND A SHARED POLICY

CROSS REFERENCE TO RELATED APPLICATIONS

This application is a continuation of and claims priority to PCT Application No. PCT/EP2018/063275, filed on May 22, 2018, which claims priority to U.S. Provisional Application No. 62/508,991, filed on May 19, 2017. The disclosures of the prior applications are considered part of and are incorporated by reference in the disclosure of this application.

BACKGROUND

This specification relates to methods of training neural networks to perform multiple tasks, and to adaptive computer systems, such as neural network systems, for performing multiple tasks.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some of the techniques described herein have applications in the field of reinforcement learning. In a reinforcement learning system, an agent interacts with an environment by performing actions that are selected by the reinforcement learning system in response to receiving observations that characterize the current state of the environment. Some reinforcement learning systems select the action to be performed by the agent in response to receiving a given observation in accordance with an output of a neural network.

SUMMARY

This specification describes an adaptive system, such as a neural network system, implemented as computer programs on one or more computers in one or more locations for performing multiple different tasks, and methods for training a system to perform such tasks. Preferably the tasks are related; respective parts of the system may then learn a shared behavior and a task-specific behavior. Knowledge may be shared between these parts of the system.

Workers may be associated with corresponding tasks or groups of tasks. The worker(s) associated with each task or group of tasks are arranged to perform that task, or group of tasks. The system may employ and/or generate, for each task, at least one respective "task policy" which indicates how the worker(s) associated with that task should perform the task. If there is one worker per policy, this may equivalently be regarded as a "worker policy". If there are multiple workers associated with a given one of the tasks, they may share the task policy for that task (i.e. the task policy is used as a worker policy for each of those multiple workers), or alternatively each of the multiple workers may have a respective worker policy which is a task policy for that task.

A shared or common part of the system may learn a multitask policy. The shared part may be, but need not be, a neural network.

The task policies may stay close to the common, multitask policy according to a measure of distance between the policies; for example the multitask policy may define a centroid of the task policies. The task policies may be, but need not be, implemented using respective neural networks. They may, but need not, operate substantially independently of one another.

In one example, the system may be part of a reinforcement learning system. The tasks may comprise the control of respective agents ("workers") acting on or within one or more environments (e.g. the same environment or respective environments). The system may output data ("action data") for selecting actions for the agents to perform. For example the system may input data to observe or otherwise receive data relating to states of the environment(s), and based on an observed state may determine an action to perform. Each environment may be real or simulated. The data for selecting the actions to perform may be generated using the one or more task policies. Each task policy may specify an action to be performed for an observed state, or may specify a distribution from which the action to be performed for the observed state may be obtained as a sample.

Although the system may be part of a reinforcement learning system, it need not be. For example the techniques described can be applied to tasks such as image or video recognition or classification, for example using a feedforward network with convolution. In general the system can be configured to receive any kind of digital data input and to generate any kind of score, classification, or regression output based on the input.

For example, if the inputs to the neural network are images or features that have been extracted from images, the outputs generated by the neural network for a given image may be scores for each of a set of object categories, with each score representing an estimated likelihood that the image contains an image of an object belonging to the category.

As another example, if the inputs to the neural network are Internet resources (e.g., web pages), documents, or portions of documents or features extracted from Internet resources, documents, or portions of documents, the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, if the input to the neural network is a sequence representing a spoken utterance, the output generated by the neural network may be a score for each of a set of pieces of text, each score representing an estimated likelihood that the piece of text is the correct transcript for the utterance.

When used as part of a reinforcement learning system the environment may be a simulated environment such as video game and the worker may be a simulated user playing the video game. As another example, the simulated environment may be a motion simulation environment, e.g., a driving simulation or a flight simulation, and the worker is a simulated vehicle navigating through the motion simulation. In these implementations, the actions may be control inputs to control the simulated user or simulated vehicle.

In some other implementations, the environment is a real-world environment and the worker is a mechanical worker interacting with the real-world environment. For example, the worker may be a robot interacting with the environment to accomplish a specific task. As another example, the worker may be an autonomous or semi-autonomous vehicle navigating through the environment. In these implementations, the actions may be control inputs to control the robot or the autonomous vehicle.

In general, one innovative aspect of the subject matter described in this specification can be embodied in methods of training a multitask computer system, such as a multitask neural network system, the system including a set of trainable workers in combination with a shared module, such as a shared policy network. The said trainable workers and the shared module may be trained in a coordinated manner on a plurality of different tasks such that each worker learns to perform a corresponding associated task according to a respective task policy, and the shared module learns a multitask policy representing common behavior for the tasks. For example, during the training errors/weight adjustments from the coordinated training may be propagated through both a shared policy network and the trainable workers. The system may learn via a supervised or unsupervised loss, for example with reinforcement learning. The shared part of the system (i.e. the shared module, e.g. the shared policy network) may be trained on the behavior of the workers, and vice-versa.

The propagated errors may be determined by optimizing an objective function. The objective function may comprise a first entropy term measuring a difference between a distribution of the task policy and a distribution of the multitask policy. This term may comprise a Kullback-Leibler divergence, and may be discounted by a discount factor. The objective function may also comprise a second entropy term dependent upon the distribution of the task policy, to encourage exploration. The second entropy term may also be discounted by the same or a different discount factor.

In a reinforcement learning system the task policy distribution and the multitask policy distribution may comprise state-action distributions. The objective function may include a discounted reward term dependent upon an expected reward from taking an action in a state. Such a reinforcement learning system may be based upon, for example, a Deep Q-Network (DQN), a Double-DQN, an Advantage Actor Critic (A3C) network, or other architectures. Learning may be synchronous or asynchronous; for example the Hogwild!Algorithm may be employed for parallel stochastic gradient descent (or ascent) learning.

The coordinated training may involve alternating between training one or more of the trainable workers (i.e. the respective task policy of the associated tasks) and training the shared policy network. Thus, the system may alternate between learning the task (worker) policies and distilling the multitask policy, for example learning in an iterative manner. Alternatively a set of worker neural networks and the shared policy network may be trained jointly, i.e. optimized together for both worker (task) and multitask policies, for example by using a combined loss function as described above. A separate network may be used for each worker (task) policy and the shared policy network only for the multitask policy, or worker networks may define soft advantage over the multitask policy, where the soft advantage may be parameterized by a controllable temperature value.

In general the coordinated training may comprise back propagation including a gradient term which aims to match probabilities from the task policies to probabilities from the multitask policy to distil the multitask policy from the task policies.

In another aspect a multitask neural network system processes input data relating to one of a plurality of learned tasks to be performed and provides output data to control performance of the task. Such a system may comprise an input to receive the input data and a set of workers, coupled to the input, each configured to perform a respective task by outputting action data according to a respective task policy. A shared policy network may be coupled to one or both of the input and the set of workers, and may define a learned multitask policy representing common behavior for the tasks. The multitask neural network system may be configured to combine the output of an adaptive system for each task with the learned multitask policy to define a task policy for the task, to enable at least one worker to perform the corresponding learned task.

The workers (agents) may comprise neural networks; they may share some, all, or no weights with the shared policy network. The system may have a multicolumn architecture in which worker neural network modules define at least one column of neural network layers, and in which the shared policy network defines a second column of neural network layers. The workers and shared policy network may together define, for example, a reinforcement learning system or a feedforward neural network, for example with convolution.

The subject matter described in this specification can be implemented in particular embodiments so as to realize one or more of the following advantages. The methods can be used to more efficiently train a neural network. For example the networks can more effectively benefit from transfer learning in which training on one task can be used to bootstrap training on another, related task. This may reduce the total amount of training data required per task. The methods can be used to distil common behavior from workers operating on multiple different tasks. Moreover such systems can learn faster and produce improved final performance on a task after training. They may be more robust to hyper-parameter settings. They may also have fewer parameters overall for a given performance on each task. The techniques are generally applicable to many different neural network architectures, including architectures for supervised and unsupervised learning, architectures for reinforcement learning, and architectures for data classification.

BRIEF DESCRIPTION OF THE DRAWINGS

FIG. 4 shows a method for training the multitask adaptive computer system.

FIG. 5 shows a portion of a first multitask neural network system.

FIG. 6 shows a portion of a second multitask neural network system.

Like reference numbers and designations in the various drawings indicate like elements.

DETAILED DESCRIPTION

This specification discloses a multitask adaptive computer system, such as a multitask neural network system. The system is to be implemented by one or more computers configured to perform particular operations or actions. Each computer has installed on it software, firmware, hardware, or a combination of them that in operation cause the computer to perform the operations or actions. For one or more computer programs to be configured to perform particular operations or actions means that the one or more programs include instructions that, when executed by data processing apparatus, cause the apparatus to perform the operations or actions.

Figure 1:
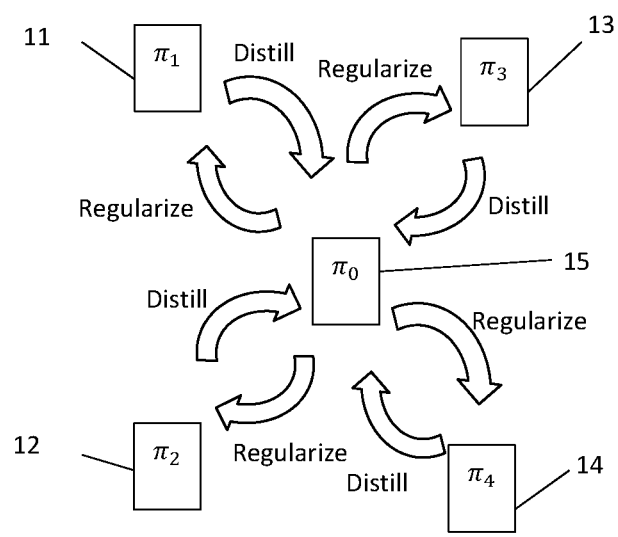
FIG. 1 shows schematically a multitask adaptive computer system such as a multitask neural network system.

FIG. 1 provides a high level illustration of the multitask adaptive computer system. For the sake of example only it is illustrated as being for performing four tasks, but the system is readily generalized to any plural number of tasks. In the case of four tasks, the neural network system may comprise four workers 11, 12, 13, 14 which are each for performing a respective one of the tasks. In variations of the system, the number of workers may be higher than the number of tasks, such that one of more of the tasks may be associated with a respective sub-set of the workers which includes a plurality of the workers, and those task(s) are performed by the associated set of workers. The subsets of the workers may be non-overlapping.

Each worker generates an output which is a respective function of its inputs. The function depends upon the task which the worker for performing, and is referred to as a respective task policy (alternatively it can be referred to as a worker policy). The respective task policies for the four workers are respectively denoted by $\pi_1$, $\pi_2$, $\pi_3$ and $\pi_4$. Each policy may not be deterministic. In other words, it may be a sample from a probability distribution defined by the respective policy, which specifies respective probabilities for all possible outputs of the worker.

In addition, the multitask adaptive computer system comprises a shared module 15, which stores a "multitask policy", denoted $\pi_0$, which is also a function which generates at least one output from its inputs. Again, the function may optionally be stochastic; that is, it may be a sample from a probability distribution defined by the multitask policy. The shared module 15 may be implemented as a neural network referred to here as a "shared policy network".

The task policies $\pi_1$, $\pi_2$, $\pi_3$ and $\pi_4$, and the multitask policy $\pi_0$ are generated together in a coordinated training procedure described below. During this training each worker learns to perform a respective one of the tasks according to the respective task policy, and the shared policy network learns the multitask policy $\pi_0$. Specifically, during the coordinated training procedure, the multitask policy $\pi_0$ is adapted to "distil" the common behaviors or representations from the task-specific task policies $\pi_1$, $\pi_2$, $\pi_3$ and $\pi_4$.

Simultaneously, the multitask policy $\pi_0$ is used to "regularize" the task policies $\pi_1$, $\pi_2$, $\pi_3$ and $\pi_4$, such that the task policies do not overly diverge from the multitask policy. As explained in more detail below, the regularization may be based on a Kullback-Leibler (KL) divergence. In this way, knowledge gained in one task is distilled into the shared policy, then transferred to other tasks.

In one example, the tasks performed by the respective workers are generating actions to be performed by respective agents which act on, or within, one or more environments. For example, each agent may act on, or within, the same environment, and this is assumed below. In a variation, there may be multiple environments, and a corresponding one or more of the agents may act on, or within, each environment; the environments typically resemble each other according to some criterion.

In order to interact with the environment, the computer system receives data ("state data") characterizing the current state of the environment and causes each agent to perform a respective action a which an element of an action space denoted by A, i.e., a discrete action space or continuous action space, in response to the received data. Data characterizing a state of the environment will be referred to in this specification as an observation. Denoting each of a number of times denoted by t, the state data may be denoted as $s_t$, and indicates the state of the (corresponding) environment at time t. The set of all possible realizations of the state data is denoted by S. Thus $s_t \in S$.

Figure 2:
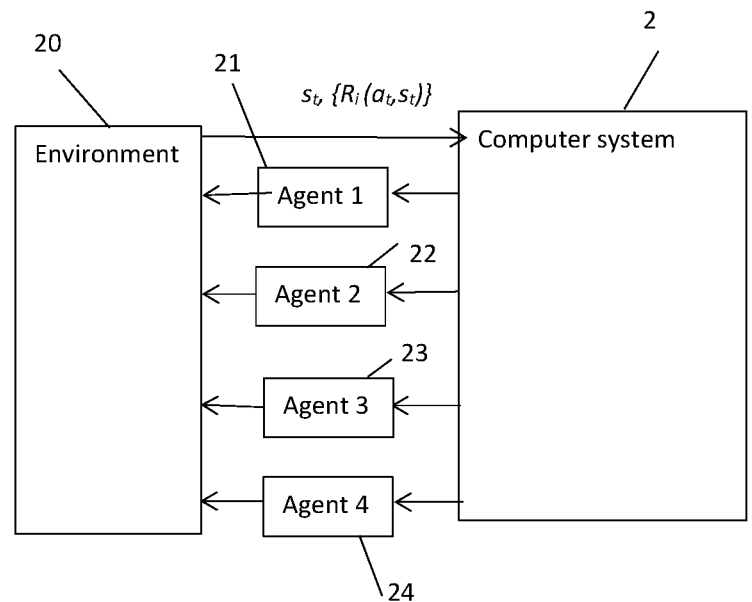
FIG. 2 shows the multitask adaptive computer system of FIG. 1 used to perform reinforcement learning.

An example of the situation is illustrated in FIG. 2, where, for simplicity a single computer 2 is illustrated. The computer 2 implements the multitask adaptive computer system illustrated in FIG. 1. The four tasks are to control four respective agents 21, 22, 23, 24 which act on or within an environment 20.

Figure 3:
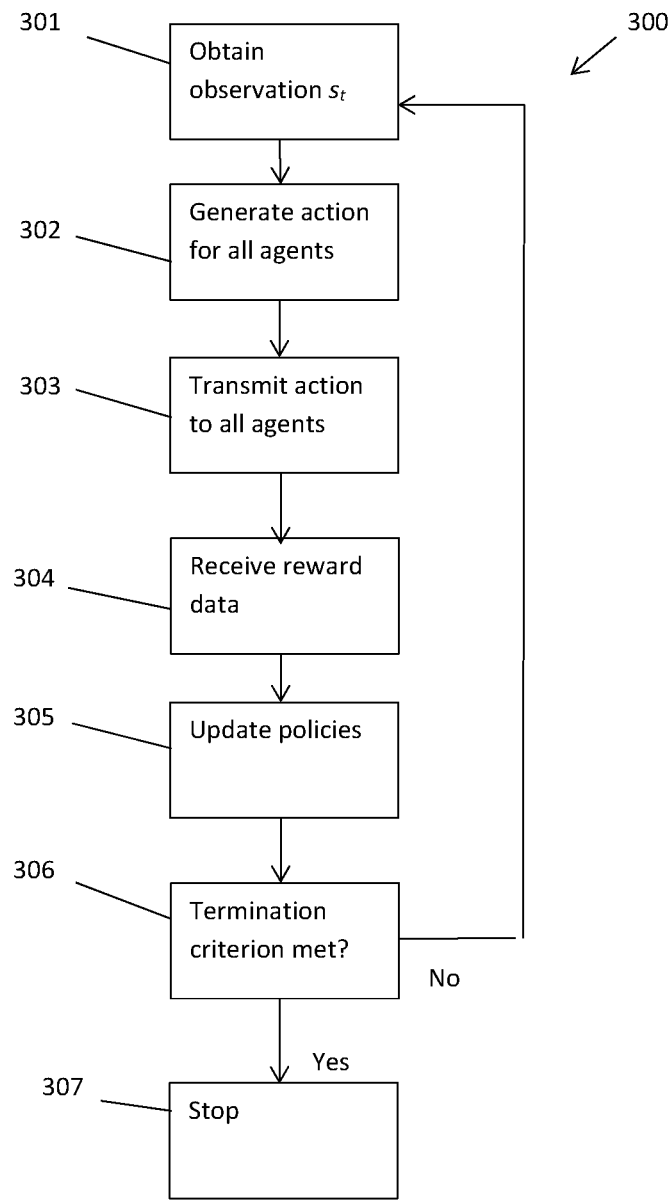
FIG. 3 shows a method performed by the multitask adaptive computer system.

FIG. 3 illustrates a method 300 performed by the multitask computer system of FIG. 1. At a time t, the computer 1 receives state data $s_t$ from the environment 20 (step 1). The integer index i is used to label the tasks (thus, i takes one of the values 1, 2, 3 or 4). Since in this example the number of tasks equals the number of workers, the index i can also be considered as labelling the workers.

In step 302, the four workers of the multitask computer system of FIG. 1 generate respective action data. The action data specifies, for each of the agents 21, 22, 23, 24 a respective action $a_t$ which is a respective element of A.

In step 303, the computer 2 transmits the action data to the respective agents 21, 22, 23, 24.

In step 304, once the agents 21, 22, 23, 24 have performed the respective actions at on the environment 20, the multitask computer system receives reward data specifying a reward $\{R_i(a_t, s_t)\}$ for each of the tasks. These may be transmitted from the environment 20 to the computer 2, or calculated by a separate module (not shown).

In step 305 the policies for each of the agents and the multitask policy are updated.

In step 306 it is determined whether a termination criterion is satisfied. If so, the method terminates (step 307). If not, the method returns to step 301, to await the next state data. Index t is updated to t+1.

The situation of FIG. 2 can be varied in several respects. Firstly, the computer 2 may be replaced by multiple computers which act in concert to implement the multitask adaptive computer system.

In some implementations, there are multiple environments, with one of more of the agents acting in each of the environments.

In some implementations the environment is a simulated environment (e.g., simulated by the computer 2) and each agent is implemented as one or more computers interacting with the simulated environment. For example the simulated environment may be a video game and the agent may be a simulated user playing the video game.

In other implementations the environment is a real-world environment and the agent is a mechanical agent interacting with the real-world environment. For example, the agent may be a robot interacting with the environment to accomplish a specific task or an autonomous or semi-autonomous vehicle navigating through the environment. In these cases the observation can be data captured by one or more sensors of the agent as it interacts with the environment, e.g., a camera, a LIDAR sensor, a temperature sensor, and so forth.

The system has an advantage that each agent such as a robot, or autonomous or semi-autonomous vehicle can improve its interaction with a simulated or real-world environment.

The training procedure will now be explained on a mathematical level. The number of tasks is denoted as n, i.e. the index i=1, . . . n. For simplicity we assume that each task has an infinite horizon, and each has the same discount factor $\gamma$. The method can be easily generalized to other scenarios like undiscounted finite horizon. For simplicity, we will also assume that the action space A and state space S are the same for all the tasks. A given action is denoted by a, where a∈A. The transition dynamics $p_i(s'|s, a)$ and reward functions $R_i(a,s)$ are different for each task i.

We further assume that a single respective worker is associated with each task, and let $\pi_i$ be a task-specific stochastic task policy for the respective i-th task. (Since there is one worker per task, the task policy can equivalently be considered as a worker policy.) The dynamics and policies give rise to joint distributions over state and action trajectories starting from some initial state, and we will also denote these distributions by $\pi_i$. The neural network system also stores a "multitask policy" $\pi_0$. The multitask policy $\pi_0$ will capture agent behavior that is common across the tasks.

The task policies and the multitask policy are generated together in a coordinated training process by optimizing an objective function which comprises a term indicative of expected returns and one or more regularization terms which provide policy regularization. A first regularization term ensures that each task policy $\pi_i$ is regularized towards the multitask policy, and may be defined using discounted KL divergences $$\mathbb{E}_{\pi_i}\left[E_{t\geq 0}\gamma^t \log\frac{\pi_i(a_t \mid s_t)}{\pi_0(a_t \mid s_t)}\right].$$

An additional regularization term is based on discounted entropy to further encourage exploration.

Specifically, the objective function to be maximized is:

$$J(\pi_0, \{\pi_i\}_{i=1}^n) = \sum_i \mathbb{E}_{\pi_i}\left[\sum_{t\geq 0}\gamma^t R_i(a_t, s_t) - c_{KL}\gamma^t \log\frac{\pi_i(a_t \mid s_t)}{\pi_0(a_t \mid s_t)} - c_{Ent}\gamma^t \log\pi_i(a_t \mid s_t)\right] \quad (1)$$

$$= \sum_i \mathbb{E}_{\pi_i}\left[\sum_{t\geq 0}\gamma^t R_i(a_t, s_t) + \frac{\gamma^t \alpha}{\beta}\log\pi_0(a_t \mid s_t) - \frac{\gamma^t}{\beta}\log\pi_i(a_t \mid s_t)\right]$$

where $c_{KL}$ and $c_{Ent}$ are scalar factors greater than zero which determine the strengths of the KL and entropy regularizations, $\alpha \equiv c_{KL}/(c_{KL}+c_{Ent})$ and $\beta \equiv 1/(c_{KL}+c_{Ent})$. The log $\pi_0$ $(a_t|s_t)$ term can be thought of as a reward shaping term which encourages actions which have high probability under the multitask policy, while the entropy term $-\log \pi_i(a_t|s_t)$ encourages exploration. In the above we used the same regularization costs $c_{KL}$ and $c_{Ent}$ for all tasks. However, it is straightforward to generalize this to task-specific costs; this can be important if tasks differ substantially in their reward scales and amounts of exploration needed, although it does introduce additional hyper-parameters.

A range of optimization techniques in the literature can be applied to maximize the above objective function (1). We now present two such approaches. The first is based on the published technique known as soft Q Learning and distillation. We will start in the simple case of a tabular representation, i.e., in the case where a table or other appropriate data structure contains explicit values for $\pi_0$ and $\pi_1$ for certain combinations of values of a and s and an alternating maximization procedure which optimizes over $\pi_i$ given $\pi_0$ and over $\pi_0$ given $\pi_i$.

This training process 400 is illustrated in FIG. 4. In a step 401, an initial estimate of the multitask policy $\pi_0$ is set (e.g. all actions equally likely).

In step 401, $\pi_i$ is modified with $\pi_0$ fixed. With $\pi_0$ fixed, (1) decomposes into separate maximization problems for each task, and is an entropy regularized expected return with a redefined (regularized) reward $$R'_i(a, s) \equiv R_i(a, s) + \frac{\alpha}{\beta}\log\pi_0(a \mid s).$$

It can be optimized using soft Q learning (also known as G learning) which is based on deriving the following "softened" Bellman updates for the state and action values (see for example, J. Schulman, P. Abbeel, and X. Chen. Equivalence between policy gradients and soft Q-Learning, arXiv: 1704.06440, 2017):

$$V_i(s_t) = \frac{1}{\beta}\log\sum_{a_t}\pi_0^\alpha(a_t \mid s_t)\exp[\beta Q_i(a_t, s_t)] \quad (2)$$

$$Q_i(a_t, s_t) = R_i(a_t, s_t) + \gamma\sum_{s_{t+1}} p_i(s_{t+1} \mid a_t, s_t)V_i(s_{t+1}) \quad (3)$$

The Bellman updates are softened in the sense that the usual max operator over actions for the state values $V_t$, is replaced by a soft-max at inverse temperature, which hardens into a max operator as: $\beta\to\infty$. The optimal policy $\pi_i$ is then a Boltzmann policy at inverse temperature $\beta$:

$$\pi_i(a_t|s_t)=\pi_0^{\alpha(a_t|s_t)}e^{\beta Q_i(a_t,s_t)-\beta V_i(s_t)}=\pi_0^{\alpha(a_t|s_t)}e^{\beta A_i(a_t,s_t)} \quad (4)$$

where $A_i(a,s)=Q_i(a,s)-V_i(s_t)$ is a softened advantage function. Note that the softened state values $V_i(s)$ act as the log normalizers in the above. The multitask policy $\pi_0$ can be interpreted as a policy prior, a perspective known in the literature on RL as probabilistic inference. However, unlike in past works, it is raised to a power of $a \leq 1$. This softens the effect of the prior $\pi_0$ on $\pi_i$, and is the result of the additional entropy regularization beyond the KL divergence.

In step 403, a modification is made to the multitask policy $\pi_0$ given the each of the modified task policies $\pi_i$. Thus, the neural network system will learn $\pi_0$ instead of it being pre-set as in some earlier multitask learning techniques (typically as a uniform distribution over actions). The only terms in (1) depending on $\pi_0$ are:

$$\frac{\alpha}{\beta}\sum_i \mathbb{E}_{\pi_i}[\sum_{t\geq 0} \gamma^t \log \pi_0(a_t|s_t)] \quad (5)$$

which is simply a log likelihood for fitting a model $\pi_0$ to a mixture of $\gamma$-discounted state-action distributions, one for each task $i$ under policy $\pi_i$. A maximum likelihood (ML) estimator can be derived from state-action visitation frequencies under roll-outs in each task, with the optimal ML solution given by the mixture of state-conditional action distributions. Alternatively, in the non-tabular case, stochastic gradient ascent can be employed, which leads precisely to an update which distills the task policies $\pi_i$ into $\pi_0$. Note however that the distillation step is derived naturally from a KL regularized objective on the policies. Another difference from prior works on the use of distillation in deep learning is that the multitask policy is "fed back in" to improve the task policies when they are next optimized, and serves as a conduit in which common and transferable knowledge is shared across the task policies.

In step 404 it is determined whether a termination criterion has been met. If not, the method 400 returns to step 402. If so, the method terminates in step 405.

Consider the effect of the extra entropy regularization. First suppose that there is no extra entropy regularization, i.e. $\alpha=1$, and consider the simple scenario of only $n=1$ task. Then (5) is maximized when the multitask policy $\pi_0$ and the task policy $\pi_i$ are equal, and the KL regularization term is 0. Thus the objective function reduces to an unregularized expected return, and so the task policy $\pi_i$ converges to a greedy policy which locally maximizes expected returns. From another point of view, the alternating maximization scheme is equivalent to trust-region methods like natural gradient or TRPO which use a KL ball centered at the previous policy, and which are understood to converge to greedy policies.

If $\alpha<1$, there is an additional entropy term in (1). So even with $\pi_0=\pi_1$ and KL $(\pi_1|\pi_0)$, the objective (1) will no longer be maximized by greedy policies. Instead (1) reduces to an entropy regularized expected returns with entropy regularization factor $\beta'=\beta/(1-\alpha)=1/c_{Ent}$, so that the optimal policy is of the Boltzmann form with inverse temperature $\beta'$. In conclusion the extra entropy term guarantees that the task policy will not turn greedy, and we can control the amount of exploration by adjusting $c_{Ent}$ appropriately.

This additional control over the amount of exploration is valuable when there are more than one task. Consider a scenario where one of the tasks is easier and is solved first, while other tasks are harder with much sparser rewards. Without the entropy term, and before rewards in other tasks are encountered, both the multitask policy and all the task policies can converge to the one that solves the easy task. Further, because this policy is greedy, it can insufficiently explore the other tasks to even encounter rewards, leading to sub-optimal behavior.

The second approach to minimization of the objective function is based on the use of a policy gradient and a better parameterization. The algorithm in the first approach alternates between maximization of the multitask policy $\pi_0$ and the task policies $\pi_i$, and is reminiscent of the EM algorithm for learning latent variable models, with $\pi_0$ playing the role of parameters, while $\pi_i$ plays the role of the posterior distributions for the latent variables. However, going beyond the tabular case, if both $\pi_0$ and $\pi_i$, are implemented using, say, deep neural networks, such an alternating maximization procedure can be slower than optimizing (1) with respect to task policies and multitask policies jointly by stochastic gradient ascent. In this case the gradient update for $\pi_i$ is simply given by a policy gradient with an entropic regularization, and can be carried out within a framework such as advantage actor-critic.

We refer to the relationship between the function performed by the neural networks, and the policies $\pi_0$ and $\pi_i$ as a "parameterization".

One simple parameterization of policies would be to use a respective neural network ("task network", or equivalently "worker network" if there is one worker per task) with parameters $\theta_i$ to implement each task policy $\pi_i$, such that the function $h_{\theta_i}(a|s)$ performed by the network is equated with $\pi_i$. Another neural network (the "shared policy network") is used to implement the multitask policy $\pi_0$, where the function performed by the policy network $h_0$ is equated with $\pi_0$. This parameterization is illustrated schematically in FIG. 5, where the shared policy network is denoted 50, and one of the task networks is denoted by 5$i$. The policy network 50 implements the policy $\pi_0$. Each task network 5$i$ operates to implement a respective policy T$\pi_i$. The only interaction between the networks 50 and 5$i$ is during the training process, not when the multitask neural network system is in use performing the tasks. The networks 50 and 5$i$ interact via the KL regularization. However, the reward term of the objective function causes the task network 50$i$ to diverge from the policy network 50 to increase the expected reward. The entropy term of the objective function produces a further tendency for the networks 50 and 5$i$ to diverge.

An alternative parameterization, which may result in faster transfer, can be obtained by considering the form of the optimal Boltzmann policy (4). Specifically, a neural network system can parameterize the multitask policy using a policy network with parameters:

$$\hat{\pi}_0(a_t|s_t) = \frac{\exp(h_{\theta_0}(a_t|s_t))}{\sum_{a'} \exp(h_{\theta_0}(a'|s_t))} \quad (6)$$

and estimate the soft advantages for each task $i$ using another respective network (a "task network", or equivalently a "worker network" if there is one worker per task) with parameters $\theta_i$ which performs function $f_{\theta_i}(a|s)$ $$\hat{A}_i(a_i|s_t) = f_{\theta_i}(a_t|s_t) - \frac{1}{\beta}\log\sum_a \pi_0^\alpha(a|s_t)\exp(\beta f_{\theta_i}(a|s_t)) \quad (7)$$

Equations (6) and (7) use "hat" notation to denote parameterized approximators of the corresponding quantities. The policy for task $i$ then becomes parameterized as, $$\hat{\pi}_i(a_t|s_t) = \hat{\pi}_0(a_t|s_t)\exp(\beta\hat{A}_i(a_t|s_t)) \quad (8)$$
$$= \frac{\exp(\alpha h_{\theta_0}(a_t|s_t) + \beta f_{\theta_i}(a_t|s_t))}{\sum_{a'}\exp(\alpha h_{\theta_0}(a'|s_t) + \beta f_{\theta_i}(a'|s_t))}$$

Note that rather than using Eqn (7) to obtain advantage estimates, the neural network system may use (8) to parameterize a policy which is optimized by policy gradients.

The situation is illustrated schematically in FIG. 6, where the policy network is denoted 60 and the i-th task network by 6i. The shared policy network 60 implements the policy $\pi_0$. By contrast to FIG. 5, in FIG. 6 the policy network 60 and each task network 6i operate together to produce a respective policy $T\pi_i$. This can be seen as a two-column architecture for the policy, with one column being the multitask policy, and the other being the adjustment required to specialize to task i. There is interaction between the networks 60 and 6i both during training and operation. During the training this is by the KL regularization. The reward term of the objective function causes the task network 60i to diverge from the policy network 60 to increase the expected reward. The entropy term of the objective function produces a further tendency for the networks 60 and 60i to diverge.

Given the parameterization above, we can now derive the policy gradients. The gradient with respect to the task specific parameters $\theta_i$ is given by the standard policy gradient theorem $$\nabla_{\theta_i} J = \mathbb{E}_{\hat{\pi}_i}\left[\left(\sum_{t\geq 1} \nabla_{\theta_i} \log \hat{\pi}_i(a_t | s_t)\right)\left(\sum_{u\geq 1} \gamma^u (R_i^{reg}(a_u | s_u))\right)\right] \quad (9)$$
$$= \mathbb{E}_{\hat{\pi}_i}\left[\left(\sum_{t\geq 1} \nabla_{\theta_i} \log \hat{\pi}_i(a_t | s_t)\right)\left(\sum_{u\geq t} \gamma^u (R_i^{reg}(a_u | s_u))\right)\right]$$

where $$R_i^{reg}(a, s) \equiv R_i(a, s) + \frac{\alpha}{\beta} \log \hat{\pi}_0(a | s) - \frac{1}{\beta} \log \hat{\pi}_i(a | s)$$

is the regularized reward. Note that the partial derivative of the entropy in the integrand has expectation $\mathbb{E}_{\hat{\pi}_t, \hat{\pi}_i}[\nabla_{\theta_i} \log \hat{\pi}_i(a_t|s_t)] = 0$ because of the log-derivative trick. If a value baseline is estimated, it can be subtracted from the regularized returns as a control variate. The gradient with respect to $\theta_0$ is:

$$\nabla_{\theta_0} J = \sum_i \mathbb{E}_{\hat{\pi}_i}\left[\left(\sum_{t\geq 1} \nabla_{\theta_0} \log \hat{\pi}_i(a_t | s_t)\right)\left(\sum_{u\geq t} \gamma^u (R_i^{reg}(a_u | s_u))\right)\right] + \quad (10)$$
$$\frac{\alpha}{\beta}\sum_i \mathbb{E}_{\hat{\pi}_i}\left[\left(\sum_{t\geq 1} \gamma^t \sum_{a_t'} \hat{\pi}_i(a_t' | s_t)\right) - \hat{\pi}_0(a_t' | s_t)\nabla_{\theta_0} h_{\theta_0}(a_t' | s_t)\right]$$

Note that the first term is the same as for the policy gradient of $\theta_i$. The second term tries to match the probabilities under the task policy $\hat{\pi}_i$ and under the multitask policy $\hat{\pi}_0$. The second term would not be present if the system parameterized $\pi_i$ using the same architecture $\hat{\pi}_i$, but did not use a KL regularization for the policy. The presence of the KL regularization causes the multitask policy to learn to be the centroid of all task policies, in the sense that the second term would be zero if $$\hat{\pi}_0(a_t' | s_t) = \frac{1}{n}\sum_i \hat{\pi}_i(a_t' | s_t)$$

and helps to transfer information quickly across tasks and to new tasks. In our experiments we found that absence of the KL regularization significantly affects the stability of the algorithm. The presence of the entropy regularization, in addition to the KL regularization, allows separate control the amounts of transfer and of exploration.

The framework we just described allows for a number of possible algorithmic instantiations, arising as combinations of objectives, algorithms and architectures, which we describe below and summarize.

First consider the trade-off of KL divergence versus entropy regularization. With $\alpha=0$, the multitask neural network system has a purely entropy-regularized objective function which does not couple and transfer across tasks. With $\alpha=1$, the multitask neural network system has a purely KL regularized objective function, which does couple and transfer across tasks, but might prematurely stop exploration if the multitask and task policies become similar and greedy. With $0>\alpha>1$, the multitask neural network system has an objective function which includes both terms.

Secondly, compare the alternative optimization (as in FIG. 4) with joint optimization. Alternating optimization leads to algorithms that resemble policy distillation/actor-mimic, but are iterative in nature with the multitask policy feeding back into task policy optimization. Also, soft Q learning can be applied to each task, instead of policy gradients. While alternating optimization may be slower, evidence from experience of policy distillation/actor-mimic systems indicates it might learn more stably, particularly for tasks which differ significantly.

Thirdly, compare separate parameterization (as in FIG. 5) to two two-column parameterization (as in FIG. 6). In the two-column case, in which each task policy is parameterized to use the multitask policy, behavior distilled into the multitask policy is "immediately available" to the task policies so transfer can be faster. However if the process of transfer occurs too quickly, it might prevent effective exploration of individual tasks.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of training a multitask neural network system to perform a plurality of tasks, the neural network system comprising (i) a plurality of task policies each corresponding to a different one of the plurality of tasks and (ii) a shared policy that is shared between the plurality of tasks,
    wherein each task policy has a respective plurality of task-specific parameters and maps an input observation to a task-specific probability distribution over actions in a set of actions,
    wherein the shared policy has a plurality of shared policy parameters and maps the input observation to a shared probability distribution over the actions in the set of actions, and
    wherein the method comprises:
        training each of the plurality of task policies on data for the task corresponding to the task policy to update the respective plurality of task-specific parameters for each of the task policies, wherein, for each task, the data for the task includes a sequence of actions each performed by a worker while attempting to perform the task, wherein the sequence of actions is generated by selecting actions to be performed by the worker using a set of input observations; and
        during the training of each of the plurality of task policies on data for the task corresponding to the task policy:
            training the shared policy using the plurality of task polices to update the plurality of shared policy parameters to learn a multitask policy representing common behavior for the tasks; and
            training each of the task policies (i) to generate a set of task-specific probability distributions that maximize expected rewards when performing the corresponding task using the set of task-specific probability distributions and (ii) using the shared policy to regularize the training of the task policies by encouraging each of the task policies to generate task-specific probability distributions that are similar to the shared probability distribution generated by processing the same input observation.

2. A method as claimed in claim 1 wherein the training is performed by optimizing an objective function, the objective function comprising, for each task:
    a reward term indicative of an expected reward earned by a worker in performing the task according to the task policy corresponding to the task; and
    at least a first entropy term measuring a difference between a distribution of the task policy corresponding to the task and a distribution of the shared policy to regularize the distribution of the task policy towards the distribution of the shared policy.

3. A method as claimed in claim 2 in which the objective function further comprises, for each task, a second, exploration entropy term dependent upon the distribution of the task policy corresponding to the task to encourage exploration.

4. A method as claimed in claim 2, wherein the tasks each comprise performing sequence of actions each to be performed in response to a corresponding observation.

5. A method as claimed in claim 4 wherein said reward term is a discounted reward term dependent upon an expected reward from taking an action in response to an observation.

6. A method as claimed in claim 1 wherein the training comprises alternating between training one or more of the task policies and training the shared policy.

7. A method as claimed in claim 1 wherein the training comprises jointly optimizing the shared policy and one or more of the task policies.

8. A method as claimed in claim 1 wherein each of the task policies is parameterized using the multitask policy.

9. A method as claimed in claim 1 wherein the task policies and the shared policy comprise one or more neural networks and the training comprises training the one or more neural networks jointly by back propagation.

10. A method as claimed in claim 9 wherein said back propagation uses an objective function which includes a term for matching probabilities from the task policies to probabilities from the multitask policy to distil the multitask policy from the task policies.

11. A system comprising one or more computers and one or more storage devices storing instructions that when executed by one or more computers cause the one or more computers to perform operations for training a multitask neural network system to perform a plurality of tasks, the neural network system comprising (i) a plurality of task policies each corresponding to a different one of the plurality of tasks and (ii) a shared policy that is shared between the plurality of tasks,
    wherein each task policy has a respective plurality of task-specific parameters and maps an input observation to a task-specific probability distribution over actions in a set of actions,
    wherein the shared policy has a plurality of shared policy parameters and maps the input observation to a shared probability distribution over the actions in the set of actions, and wherein the operations comprise:
        training each of the plurality of task policies on data for the task corresponding to the task policy to update the respective plurality of task-specific parameters for each of the task policies, wherein, for each task, the data for the task includes a sequence of actions each performed by a worker while attempting to perform the task, wherein the sequence of actions is generated by selecting actions to be performed by the worker using a set of input observations; and during the training of each of the plurality of task policies on data for the task corresponding to the task policy:

training the shared policy using the plurality of task polices to update the plurality of shared policy parameters to learn a multitask policy representing common behavior for the tasks; and training each of the task policies (i) to generate a set of task-specific probability distributions that maximize expected rewards when performing the corresponding task using the set of task-specific probability distributions and (ii) using the shared policy to regularize the training of the task policies by encouraging each of the task policies to generate task-specific probability distributions that are similar to the shared probability distribution generated by processing the same input observation.

12. A system as claimed in claim 11 wherein the training is performed by optimizing an objective function, the objective function comprising, for each task:

a reward term indicative of an expected reward earned by a worker in performing the task according to the task policy corresponding to the task; and at least a first entropy term measuring a difference between a distribution of the task policy corresponding to the task and a distribution of the shared policy to regularize the distribution of the task policy towards the distribution of the shared policy.

13. A system as claimed in claim 12 in which the objective function further comprises, for each task, a second, exploration entropy term dependent upon the distribution of the task policy corresponding to the task to encourage exploration.

14. A system as claimed in claim 12, wherein the tasks each comprise performing sequence of actions each to be performed in response to a corresponding observation.

15. A system as claimed in claim 14 wherein said reward term is a discounted reward term dependent upon an expected reward from taking an action in a response to an observation.

16. A system as claimed in claim 11 wherein the training comprises alternating between training one or more of the task policies and training the shared policy.

17. A system as claimed in claim 11 wherein the training comprises jointly optimizing the shared policy and one or more of the task policies.

18. A system as claimed in claim 11 wherein each of the task policies is parameterized using the multitask policy.

19. A system as claimed in claim 11 wherein the task policies and the shared policy comprise one or more neural networks and the training comprises training the one or more neural networks jointly by back propagation.

20. A system as claimed in claim 19 wherein said back propagation uses an objective function which includes a term for matching probabilities from the task policies to probabilities from the multitask policy to distil the multitask policy from the task policies.

21. One or more non-transitory computer-readable storage media storing instructions that when executed by one or more computers cause the one or more computers to perform operations for training a multitask neural network system to perform a plurality of tasks, the neural network system comprising (i) a plurality of task policies each corresponding to a different one of the plurality of tasks and (ii) a shared policy that is shared between the plurality of tasks, wherein each task policy has a respective plurality of task-specific parameters and maps an input observation to a task-specific probability distribution over actions in a set of actions, wherein the shared policy has a plurality of shared policy parameters and maps the input observation to a shared probability distribution over the actions in the set of actions, and wherein the operations comprise:

training each of the plurality of task policies on data for the task corresponding to the task policy to update the respective plurality of task-specific parameters for each of the task policies, wherein, for each task, the data for the task includes a sequence of actions each performed by a worker while attempting to perform the task, wherein the sequence of actions is generated by selecting actions to be performed by the worker using a set of input observations; and during the training of each of the plurality of task policies on data for the task corresponding to the task policy:

training the shared policy using the plurality of task polices to update the plurality of shared policy parameters to learn a multitask policy representing common behavior for the tasks; and training each of the task policies (i) to generate a set of task-specific probability distributions that maximize expected rewards when performing the corresponding task using the set of task-specific probability distributions and (ii) using the shared policy to regularize the training of the task policies by encouraging each of the task policies to generate task-specific probability distributions that are similar to the shared probability distribution generated by processing the same input observation.

22. One or more non-transitory computer-readable storage media as claimed in claim 21 wherein the training is performed by optimizing an objective function, the objective function comprising, for each task:

a reward term indicative of an expected reward earned by a worker in performing the task according to the task policy corresponding to the task; and at least a first entropy term measuring a difference between a distribution of the task policy corresponding to the task and a distribution of the shared policy to regularize the distribution of the task policy towards the distribution of the shared policy.

23. One or more non-transitory computer-readable storage media as claimed in claim 22 in which the objective function further comprises, for each task, a second, exploration entropy term dependent upon the distribution of the task policy corresponding to the task to encourage exploration.

24. One or more non-transitory computer-readable storage media as claimed in claim 22, wherein the tasks each comprise performing sequence of actions each to be performed in response to a corresponding observation.

25. One or more non-transitory computer-readable storage media as claimed in claim 24 wherein said reward term is a discounted reward term dependent upon an expected reward from taking an action in response to an observation.

26. One or more non-transitory computer-readable storage media as claimed in claim 21 wherein the task policies and the shared policy comprise one or more neural networks and the training comprises training the one or more neural networks jointly by back propagation.

27. One or more non-transitory computer-readable storage media as claimed in claim 26 wherein said back propagation uses an objective function which includes a term for matching probabilities from the task policies to probabilities from the multitask policy to distil the multitask policy from the task policies.

* * * * *